Sept. 6, 1966  E. D. DUKE ET AL  3,270,443
EARTH SCRAPER WITH SELF-LOADING ENDLESS CONVEYOR
Filed Dec. 11, 1963  2 Sheets-Sheet 2
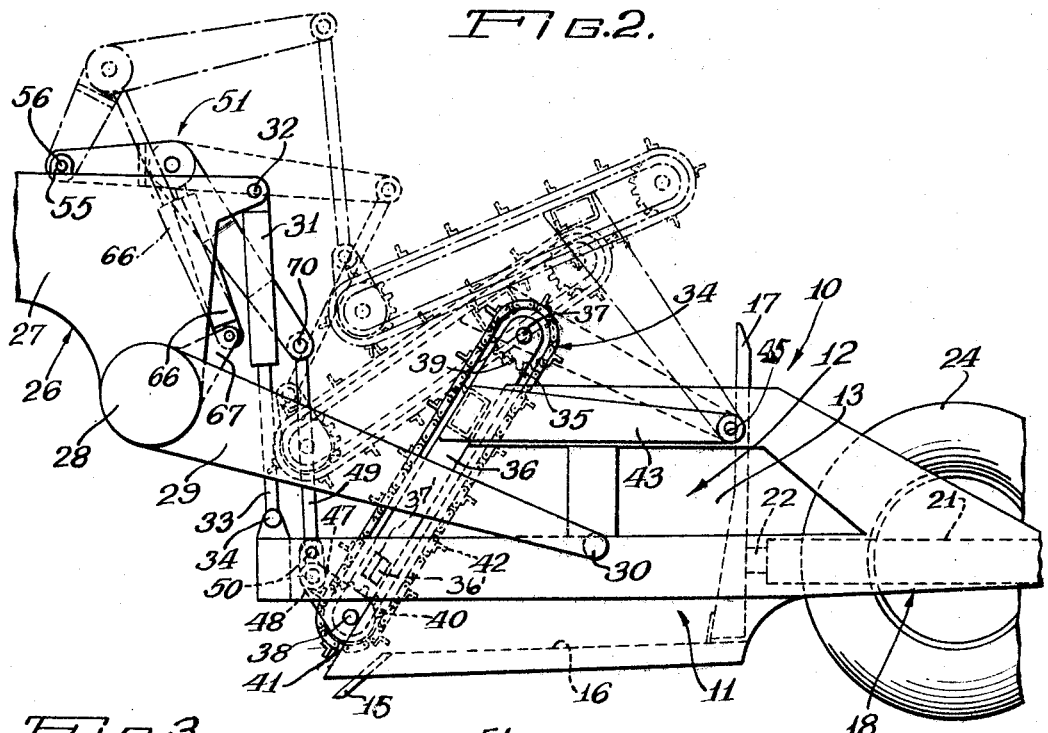
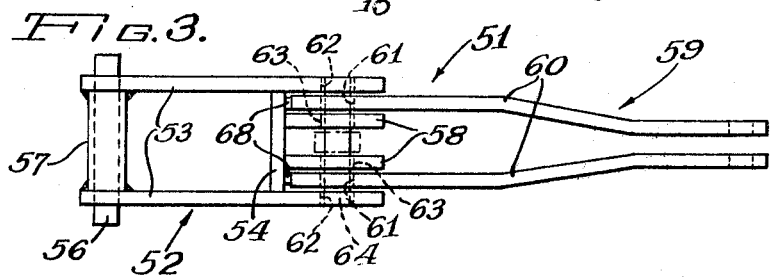
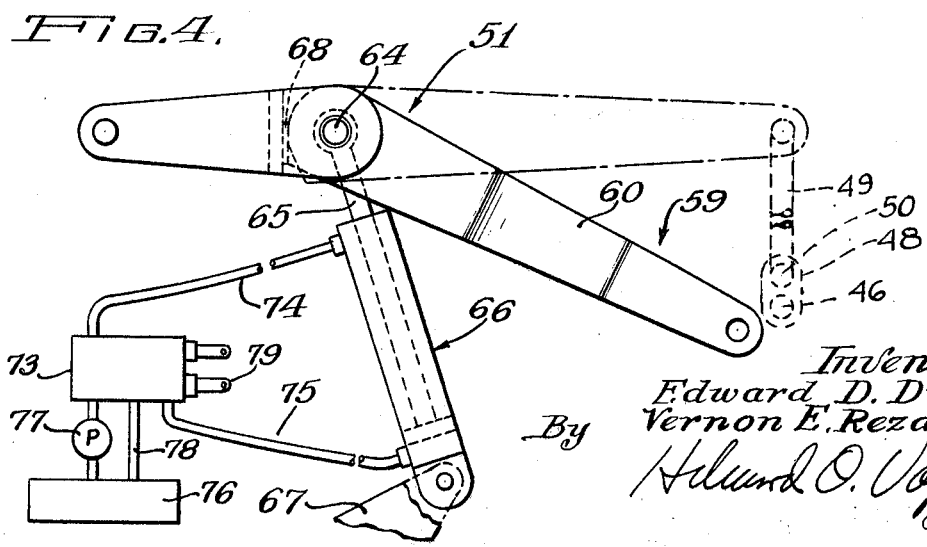
Inventors:
Edward D. Duke
Vernon E. Rezabek
By Helmuth O. Vogel
Atty.

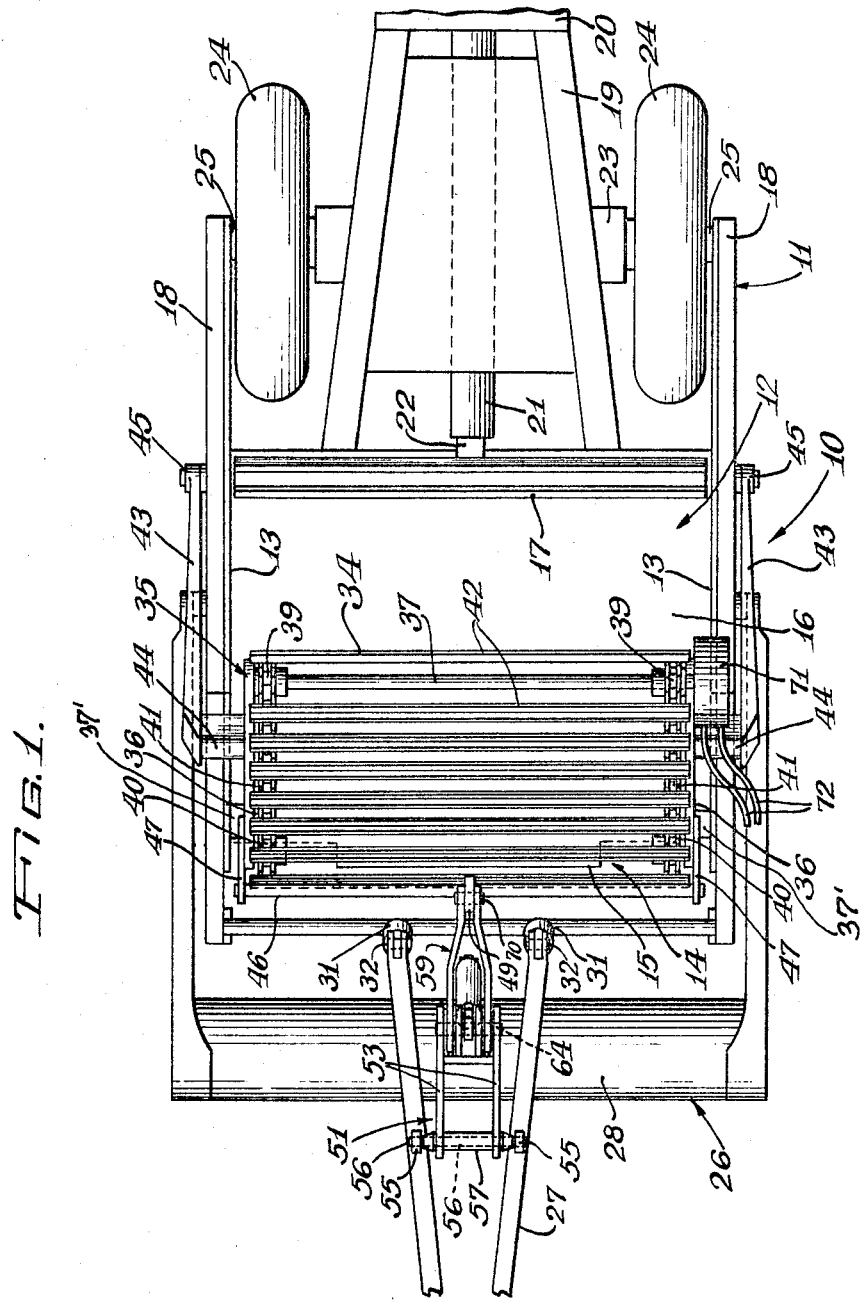

United States Patent Office 3,270,443
Patented Sept. 6, 1966

3,270,443
EARTH SCRAPER WITH SELF-LOADING
ENDLESS CONVEYOR
Edward D. Duke, Chicago, and Vernon E. Rezabek, Palatine, Ill., assignors to International Harvester Company, Chicago, Ill., a corporation of Delaware
Filed Dec. 11, 1963, Ser. No. 329,845
8 Claims. (Cl. 37—8)

This invention relates to an earth-working scraper which includes an endless conveyor for moving material into the scraper bowl.

In the conventional earth scraper which includes an endless conveyor for assisting in the loading of the scraper bowl, the endless conveyor is usually pivoted at its upper end on the bowl structure and has its lower end disposed above the cutting blade of the scraper at the forward open end of the bowl structure. In a structure of this type it is desirable that the forward end of the conveyor structure, which is usually of an endless type, be permitted to raise and lower to accommodate the various quantities of material and sizes of objects such as boulders etc. which may enter into the scraper bowl during the digging operation. In conventional scrapers such provision generally would include links pivotally connected to the forward and rear ends of the conveyor and to the bowl, the said links accommodating raising and lowering of the conveyor structure to accommodate the material which is entering into the bowl.

It is a prime object of this invention therefore to provide an improved endless conveyor raising and lowering mechanism for an earth scraper wherein the forward portion of the endless conveyor can be positively raised to an out-of-the-way position if desired and the said mechanism including provisions whereby raising and lowering of the scraper forward end is readily accomplished in response to the entrance of different quantities and sizes of material during the digging operation.

Still another object is to provide an improved raising and lowering mechanism for the endless conveyor of a self-loading scraper, the said mechanism including hydraulic ram means whereby the conveyor may be hinged and lowered in a positive manner within the control of an operator position on the tractor of a tractor-scraper combination.

A still further object of the invention is to provide an improved raising and lowering mechanism for the endless conveyor of a self-loading scraper, the said mechanism including a two-part raising and lowering lever moved in response to the actuation of a hydraulic ram, the said two-part lever having one part hingedly positioned so that when the ram is in a lowered lock position, the said arm and a linkage means connected to the conveyor will permit raising and lowering of the conveyor in response to different sizes and quantities of material entering into the scraper bowl.

A still further object is to provide an improved actuating mechanism for raising and lowering a hinged endless conveyor on a scraper bowl, the said mechanism including a two-part lever pivotally connected to the draft structure of a tractor-scraper combination and the said lever having a portion pivoted by means of a hydraulic ram and second portion hingedly connected to the first portions so that the second portion may pivot within a limited range when the hydraulic ram and forward portion of the conveyor are in a lowered position, the said limited range pivotal movement of the second portion permitting the entrance of various quantities of material into the bowl during the lowered digging position.

These and other objects will become more readily apparent from a reading of the description when examined in connection with the accompanying sheets of drawings.

In the drawings:

FIGURE 1 is a plan view of a self-loading scraper having connected thereto a conventional draft frame and an improved raising and lowering mechanism for the endless conveyor of the scraper bowl;

FIGURE 2 is a side elevational view, of the scraper, draft frame, and improvement shown in FIGURE 1;

FIGURE 3 is a detail plan view of a two-part lever assembly; and

FIGURE 4 is a side elevational view of a two-part lever assembly adapted to be actuated by means of a hydraulic ram and hydraulic circuit.

Referring now particularly to FIGURES 1 and 2, a self-loading scraper is generally designated by the reference character 10. The scraper 10 comprises a frame 11 which includes a bowl 12 having bowl sides 13 and an open front designated at 14. The scraper bowl 12 at its open front 14 has connected thereto a transversely extending scraper blade 15 suitably secured to a bowl bottom 16. The rear end of the bowl 12 includes a movable ejector gate 17 suitably supported and guided by a structurally extending rear frame member 18 extending rearwardly from the frame 11. A rearwardly extending pusher structure is designated at 19 and includes a pusher block 20 conventional in the art. A fluid ram 21 is suitably connected to the pusher structure 19 and has a piston rod 22 connected to the ejector gate 17 for moving the same forwardly to dump material from the bowl and to retract the same to its original position. A rear axle structure is designated at 23 and is suitably supported on ground wheels 24 which are journalled on axles 25 supported on the rear frame members 18.

A draft structure generally designated at 26 includes a gooseneck structure 27 which has its forward end (not shown) suitably connected to a conventional two-wheel tractor and its rearward end is secured to a transversely extending torsion tube 28 having opposite ends connected to rearwardly extending side draft members 29 which, as indicated at 30, are pivotally connected to the frame 11 and bowl 12. A pair of hydraulic rams 31 are pivotally connected as indicated at 32 to the gooseneck structure 27, the said rams 31 including extendable rods 33 pivotally connected as indicated at 34 to the frame 11 of the scraper.

The self-loading scraper 10 includes an endless conveyor generally designated by the reference character 34. The endless conveyor 34 comprises a frame 35 consisting of a pair of horizontally-spaced side plates 36 supporting at their upper ends a shaft 37 and at their lower ends a shaft 38. The shaft 37 supports a pair of sprockets 39 and the shaft 38 supports a pair of wheels 40. Endless chains 41 are trained about the sprockets 37 and wheels 40, the chains being connected to conventional conveyor flights 42. A pair of arms 43 are disposed on opposite sides of the conveyor 34, the said arms 43 being rigidly connected to the side plates 36 by means of brackets 44. The arms 43 are pivoted as indicated at 45 on the bowl 12 so that the endless conveyor with the arms 43 may be raised and lowered as a unit. As best shown in FIGURES 1 and 2, the bowl sides on their inside surfaces are provided with abutments 36'. Abutments 37' on the side plates 36 which engage abutments 36' limit the lowermost position of the endless conveyor relative to the cutting edge 15. In other words, the engagement of the abutments 36' and 37' determines the proximity of the cutting edge and the lower portion of the endless conveyor.

The side plates 36 have connected thereto at their lower forward ends a horizontally extending rod 46 by means of brackets 47. A lift bracket 48 connected to the rod 46 as best shown in FIGURE 4, has pivotally connected thereto a link 49 at 50 which is pivotally connected to a two-part lever generally designated at 51. The two-part lever 51 is particularly well shown in FIGURES 3 and 4, and comprises a first arm 52 consisting of a pair of horizontally-spaced plates 53 suitably interconnected by means of a connector plate 54. As shown in FIGURES 1 and 2, brackets 55 extend vertically upwardly from the gooseneck structure 27 and a shaft 56 is suitably connected to the brackets 55 and supports a tubular bearing 57 which is rigidly connected to the plates 53. The connector plate 54 has connected thereto a pair of relatively short forwardly extending spaced plates 58.

The two-part lever 51 comprises a second arm 59 including a pair of spaced plate members 60 provided at their forward ends with openings 61 in registry with openings 62 in the plates 53 and with openings 63 in the spaced plates 58. A pivot pin 64 projects through the openings 61, 62 and 63 so that the plates 60 or arm 59 may suitably pivot with respect to the first arm 52. As best shown in FIGURES 3 and 4 a piston rod 65 is also pivotally connected to the pin 64 between the plates 58. The piston rod 65 is reciprocal in a fluid ram generally designated at 66, the said ram 66 being pivotally mounted on a bracket 67 supported, as shown in FIGURE 2, on the transversely-exetnding torsion member 28.

As best shown in FIGURES 3 and 4 a stop abutment 68 is provided on the ends of each of the plate members 60. The stop abutment 68, as best shown in FIGURE 4, limits the clockwise travel of the second arm 59 since the stop 68 engages the plate 54 and thus limits the range of movement of the second arm 59 relative to the first arm 52. The link 49 is pivotally connected to the arm 59 as indicated at 70 in FIGURE 2. As only shown in FIGURE 1, a hydraulic motor 71 is adapted to be supported on the left hand side plate 36, the said motor being of a conventional type and providing rotating movement to the sprockets 39 by means of fluid under pressure supplied and returned by means of the conduits 72 which are suitably connected to a source of pressure and valving not described nor shown.

As best shown in FIGURE 4 the fluid ram 66 is connected to a hydraulic system consisting of a reservoir 76 suitably connected to a pump 77 for supplying fluid under pressure to a conventional control valve 73 having connected thereto lines 74 and 75 respectively communicating with the upper and lower ends of the rams 66. A return line 78 extends from the control valve 73 to the reservoir 76. A valve spool 79 may be operated to alternatively supply the conduit 74 or 75 with pressure thereby lowering and raising the two-part lever 51 for raising and lowering the conveyor 34 as will now be described.

The scraper 10 functions in a conventional manner in that by lowering of the scraper bowl and the blade 16 into digging position by means of the hydraulic ram 31, material enters the scraper bowl. When the scraper bowl is filled with material the hydraulic ram 21 is actuated to move the ejector gate 17 forwardly for discharging the material, whereupon the ejector gate 17 is then returned to its normal position. During the digging position of the bowl, power supplied by the hydraulic motor 71 operates the endless conveyor 34 whereupon the conveyor flights 42 are moved in a counterclockwise direction around the sprockets 40 assisting in loading of the material into the bowl 12. In the loading position, as shown in FIGURE 1, the lower end of the conveyor 34 is positioned a short distance above the blade 16 and is retained in this position by the arm 59 with the stop 68 against the plate 54. As the conveyor is operating and the blade is digging dirt moves into the bowl and the conveyor flights assist to scrape the material into the bowl for quick and expeditious filling. In this particular position, the fluid ram 66 is in the position shown in FIGURE 4 and the piston rod 65 is locked against movement. The arm 59 now may move upwardly within a limited range so as to accommodate hinging movement of the conveyor about the pivot 45 to accommodate different sizes, quantities, etc. of the material which may be entering into the scraper bowl. Thus a boulder, rock or other large size object is encountered by the blade 16, the conveyor may raise to accommodate the entrance of such material without injury to the conveyor and the conveyor also thus can assist in the rearward travel of such material into the scraper bowl. To raise the conveyor, fluid from the reservoir 76 is supplied to the conduit 75 in response to selection of the control spool 79 so that pressure through the conduit 75 causes extension of the rod 65 thereupon moving the two-part lever about its pivot shaft 56 whereupon the arm 59 with its stop against the plate 54 is raised to the maximum high position shown in the dotted line position of FIGURE 2. In this raised position the ejector gate may be moved forwardly to effectuate dumping of the material from the bowl. Movement of the ejector 17 and raising of the conveyor also may be accomplished by suitable sequencing valves which are not shown since they form no part of the present invention. Lowering of the conveyor, of course, takes place when pressure is supplied to the conduit 74 from the valve 73 and the return fluid flows through conduit 75 through the control valve 73 to conduit 78 to the reservoir 76.

It can be seen therefore that an improved raising and lowering mechanism for a self-loading conveyor and scraper combination has been herein disclosed. Positive raising and lowering is positively effected when desired and the two-part lever is constructed to permit limited raising movement of the lower end of the conveyor when desired so as to accommodate the difference in quantities and size of material which may enter into the scraper bowl. Thus it is believed that the objects of the invention have been fully achieved and modifications may be made without departing from the spirit of the invention as disclosed or from the scope thereof as defined in the appended claims.

What is claimed is:

1. In a self-loading scraper having a mobile bowl including an open material receiving end, material ejector means on said bowl, a draft frame connected to said bowl including means for raising and lowering said bowl from and into material digging position relative to the ground, and an endless conveyor pivotally supported in an inclined position within said bowl whereby the lower end thereof may be raised and lowered relative to said open end; a raising and lowering mechanism for said conveyor comprising a lever having first and second arms, means pivotally connecting said first arm to said draft frame for hinging movement about a horizontal axis, means pivotally connecting said second arm to said first arm for hinging movement about a second horizontal axis, a fluid ram on said draft frame connected to said first arm, means connecting said second arm to said endless conveyor, means on said arms limiting the hinging movement of said second arm relative to said first arm whereby during the lowered position of said conveyor, said lower end may raise and lower with said second arm in response to the material conveyed to said bowl, and said ram being operable for raising and lowering said conveyor.

2. In a self-loading scraper having a mobile bowl including an open material receiving end, material ejector means on said bowl, a draft frame connected to said bowl including means for raising and lowering said bowl from and into material digging position relative to the ground, and an endless conveyor pivotally supported in an inclined position within said bowl whereby the lower end thereof may be raised and lowered relative to said open end; raising and lowering mechanism for said conveyor comprising a two-part lever having a first part pivotally connected to said draft frame and a second part pivotally connected to said first part for limited hinging movement in a limited range, means connecting said second part to said conveyor, and a fluid ram connected to said draft frame and said first part and being extendable and retractable for respectively raising and lowering said lever, said second part in the lowered position of said lever within its limited range permitting raising and lowering of said conveyor end in response to quantities of material entering into said bowl.

3. In a self-loading scraper, a raising and lowering mechanism in accordance with claim 2 wherein said ram in an extended position raises said lever, and wherein said second lever part is free to move in its limited range when said ram is in a retracted position.

4. In a self-loading scraper having a mobile bowl including an open material receiving end, material ejector means on said bowl, a draft frame connected to said bowl including means for raising and lowering said bowl from and into material digging position relative to the ground, and an endless conveyor pivotally supported in an inclined position within said bowl whereby the lower end thereof may be raised and lowered relative to said open end; a raising and lowering mechanism for said conveyor comprising a lever having first and second arms, means pivotally connecting said first arm to said draft frame for hinging movement about a horizontal axis, means pivotally connecting asid second arm to said first arm for hinging movement about a second horizontal axis, a fluid ram on said draft frame connected to said first arm, said ram being extensible for raising said lever and conveyor and retractable for lowering the same, means connecting said second arm to said endless conveyor, means on said arms limiting the hinging movement of said second arm relative to said first arm whereby during the retracted position of said ram, said lower end may raise and lower with said second arm in response to the material conveyed to said bowl.

5. A self-loading scraper comprising,
(a) a mobile frame,
(b) said frame including an open end bowl having a scraper blade supported on said bowl adjacent its open end,
(c) said bowl including movable material ejector means,
(d) a draft frame including a pair of draft members pivotally supported on said frame on opposite sides thereof and extending forwardly of said bowl,
(e) a first fluid ram connected to said mobile frame and draft frame for raising and lowering said bowl,
(f) an inclined endless conveyor hingedly supported on said frame, positioned within said bowl and having a lower end in proximity to said scraper blade for conveying material into said bowl,
(g) means for raising and lowering said endless conveyor whereby said lower end is movable vertically relative to said scraper blade comprising;
(h) a first arm pivotally connected to said draft frame for pivotal movement about a transverse axis,
(i) a second arm including pivot means connecting said second arm to said first arm for pivotal movement about a second transverse axis,
(j) a lifting link pivotally connected to said second arm and to said endless conveyor,
(k) a second fluid ram supported on said draft arm and pivotally connected to said first arm for moving said arms to raise and lower said endless conveyor,
(l) and means on said second arm engageable with said first arm limiting pivotal movement of the second arm relative to said first arm during the lowered position of said conveyor whereby said lower end of said conveyor may be raised and lowered in response to differences in quantities of material conveyed into said bowl.

6. A self-loading scraper comprising,
(a) a mobile frame,
(b) said frame including an open end bowl having a scraper blade supported on said bowl adjacent its open end,
(c) said bowl including movable material ejector means,
(d) a draft frame pivotally supported on said frame and extending forwardly of said bowl,
(e) a first fluid ram connected to said mobile frame and draft frame for raising and lowering said bowl,
(f) an inclined endless conveyor hingedly supported on said frame for conveying material into said bowl,
(g) means for raising and lowering said endless conveyor whereby said conveyor is movable vertically relative to said scraper blade comprising;
(h) a first arm pivotally connected to said draft frame for pivotal movement about a transverse axis,
(i) a second arm including pivot means connecting said second arm to said first arm for pivotal movement about a second transverse axis,
(j) a lifting link pivotally connected to said second arm and to said endless conveyor,
(k) a second fluid ram supported on said draft arm and pivotally connected to said first arm for moving said arms to raise and lower said endless conveyor,
(l) and means on said second arm engageable with said first arm limiting pivotal movement of the second arm relative to said first arm during the lowered position of said conveyor whereby said lower end of said conveyor may be raised and lowered in response to differences in quantities of material conveyed into said bowl.

7. A self-loading material scraper comprising,
(a) a mobile frame,
(b) said frame including an open end bowl having a material scraper blade,
(c) movable ejector means on said bowl,
(d) a draft frame connected to said mobile frame,
(e) means connected between said frames for raising and lowering said bowl,
(f) an inclined endless conveyor hingedly supported on said frame and being movable vertically relative to said scraper blade,
(g) a first arm pivotally connected to said draft frame,
(h) a second arm pivotally connected to said first arm,
(i) means connected between said arms for limiting pivotal movement of said second arm relative to said first arm within a predetermined range,
(j) a rigid link pivotally connected to said second arm and to said inclined conveyor,
(k) a fluid ram connected to said draft frame and to said first arm,
(l) means supplying fluid to said ram to pivot said arms on said draft frame for raising and lowering said conveyor, and
(m) means locking said fluid ram in a lowered position of said conveyor whereby during raising and lowering of said conveyor in response to material entering said open end said second arm is adapted to pivot within said predetermined range.

8. A self-loading material scraper comprising,
(a) a mobile frame,
(b) said frame including an open end bowl having a material scraper blade,
(c) movable ejector means on said bowl,
(d) a draft frame connected to said mobile frame,
(e) means connected between said frames for raising and lowering said bowl,
(f)) an inclined endless conveyor hingedly supported on said frame and being movable vertically relative to said scraper blade,
(g) a first arm pivotally connected to said draft frame, (h) a second arm pivotally connected to said first arm,
(i) means connected between said arms for limiting pivotal movement of said second arm relative to said first arm within a predetermined range,
(j) means connecting said second arm and said inclined conveyor,
(k) a fluid ram connected to said draft frame and to said first arm, and
(l) means supplying fluid to said ram to pivot said arms on said draft frame for raising and lowering said conveyor, whereby during raising and lowering of said conveyor in response to material entering said open end said second arm is adapted to pivot within said predetermined range.

References Cited by the Examiner

UNITED STATES PATENTS

| | | |
|---|---|---|
| 2,106,759 | 2/1938 | Paulsen. |
| 2,956,353 | 10/1960 | Hanner et al. _____ 37—8 |
| 2,984,022 | 5/1961 | Johnson _____ 37—8 |

FOREIGN PATENTS 800,256  10/1950  Germany.

ABRAHAM G. STONE, *Primary Examiner.*

R. L. HOLLISTER, *Assistant Examiner.*